No. 731,417. PATENTED JUNE 16, 1903.
M. THORNE.
PIE PLATE OR BAKE PAN, &c.
APPLICATION FILED JAN. 31, 1903.
NO MODEL.

WITNESSES:
C. W. Benjamin
Ernest J. Weber

INVENTOR
M. Thorne
BY
O. Ellery Edwards
ATTORNEY

No. 731,417. Patented June 16, 1903.

UNITED STATES PATENT OFFICE.

MILLIE THORNE, OF NEW YORK, N. Y.

PIE-PLATE OR BAKE-PAN, &c.

SPECIFICATION forming part of Letters Patent No. 731,417, dated June 16, 1903.

Application filed January 31, 1903. Serial No. 141,256. (No model.)

*To all whom it may concern:*

Be it known that I, MILLIE THORNE, a citizen of the United States, and a resident of the city of New York, borough of Manhattan, county and State of New York, have invented a new and useful Improvement in Pie-Plates or Bake-Pans and Similar Articles, of which the following is a specification.

The object of my invention is to provide a plate or pan of this kind that may readily be opened or separated into its constituent parts to allow the removal of the pie or other food baked therein without in any way injuring the pie or in any way disturbing its contents and also to prevent the pie from being burned in any part during its baking. These and other objects I accomplish by my invention, which consists of a plate which may be divided into its constituent parts along radial lines extending from its center, and vertical partitions extend from certain of these radial lines above the walls of the plate, so that these partitions will always extend partially through the upper crust or surface of the pie. The pie-plate is provided with projections on its lower surface, which prevent the plate from coming in intimate contact with the stove or oven in which the pie may be baked and allow air to freely circulate between the pie-plate and stove or oven.

For a more particular description of my invention reference is to be had to the accompanying drawings, forming a part of this specification, in which—

Figure 1:
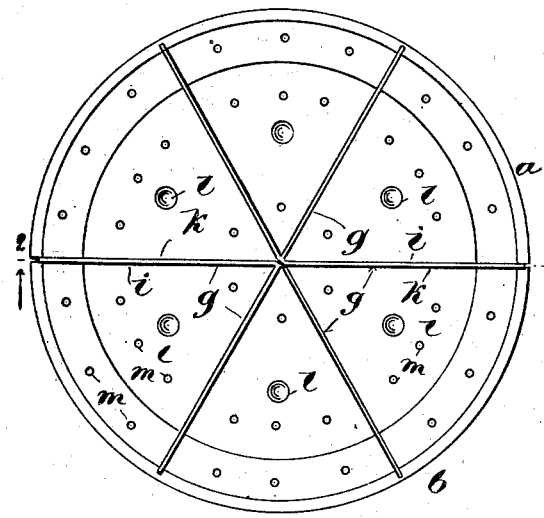
Figure 5:
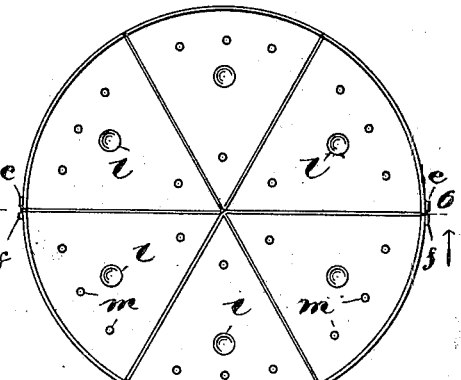
Figures 2, 6:
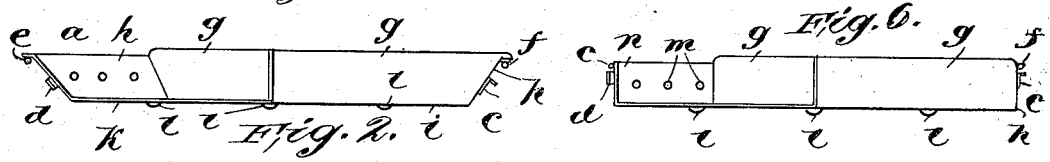
Figure 3:
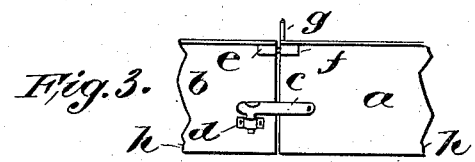
Figure 4:
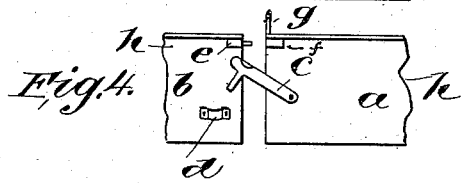
Figure 8:
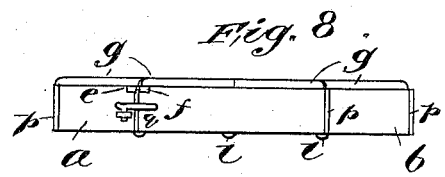
Figure 7:
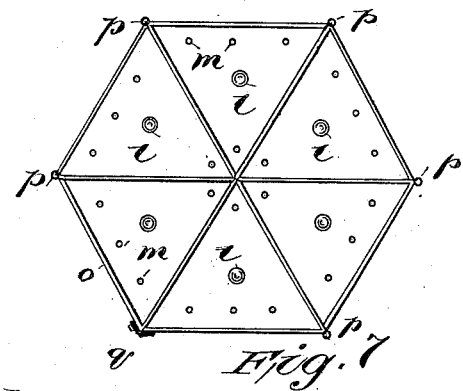
Figure 9:
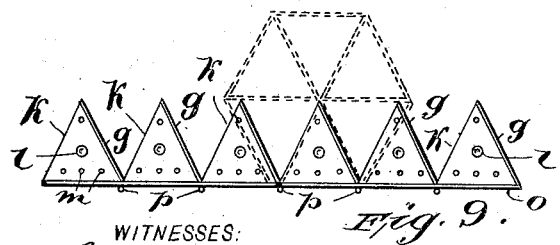

Figure 1 is a plan view of my invention as applied to a pie-plate. Fig. 2 is an elevation of an element of my invention above the line 2 2 of Fig. 1 and looking in the direction of the arrows. Figs. 3 and 4 are detailed views showing the manner in which the parts are held together. Fig. 5 is a plan view of another embodiment of my invention as applied to a bake-pan. Fig. 6 is an elevation of the portion above the line 6 6 of Fig. 5 looking in the direction of the arrows. Fig. 7 is a plan view of a third modification of my invention as applied to a different kind of bake-pan. Fig. 8 is an elevation of the same. Fig. 9 is a plan view showing this pan in its open condition, and dotted lines indicate diagrammatically its closed condition.

Throughout the various views similar characters designate similar parts.

While my invention may be applied to any sort of a bake-pan, I will first describe it as embodied in a pie-plate, as shown in Figs. 1 to 4, inclusive. This pie-plate is divided on the line 2 2 into two constituent parts $a$ and $b$, which are substantially identical in all respects, so that one description is sufficient for both. These parts are held together by means of a pivoted latch $c$, which engages any suitable catch $d$ on the other part. On the part to which the catch $d$ is secured is a dowel $e$, which engages a socket $f$ on the other part. In Figs. 3 and 4 the latch $c$ and socket $f$ are secured to the part $a$ and the catch $d$ and dowel $e$ are secured to the part $b$. As the parts $a$ and $b$ are identical, it is evident that these positions are reversed on the other fastening of the pie-plate.

While I have shown and described the plate as divided into two parts, it is evident that it may be divided into as many constituent parts as desired, which may be united as described above or in any other convenient way. Vertical and radial partitions $g$ extend from the center of the plate to the outer walls $h$ and along one-half the line of division—that is, along the radial line $i$, but not along the line $k$. The partitions $g$ extend above the walls $h$, so that they will always be above the surface of the pie that is baked, and so divide the pie into as many parts as there are partitions. Six partitions are shown, as this is generally the most convenient number to employ, although any number may be used.

The bottom of the plate is provided with projections $l$, which may be made in any desired way, although I prefer to make them by embossing or pressing curved surfaces. These projections $l$ are made sufficiently deep to allow air to circulate between the pie-plate and the surface on which it is placed. By this simple means I prevent the pie from being burned in a very hot oven. The pie-plate may also be provided with the usual perforations $m$.

The modification of my invention shown in Figs. 5 and 6 is the same as the one described above except that the walls $n$ are substantially vertical, as is usual in bake-pans.

In Figs. 7, 8, and 9 is disclosed another embodiment of my invention similar to the one shown in Figs. 5 and 6 except that the vessel is hexagonal instead of circular and is divided into six constituent parts instead of two, and these parts are hinged or otherwise secured together by a catch and dowel or any other means. The walls of the vessel are designated by the letter $o$, the hinges by $p$, and the catch by $q$. The manner in which the plate is closed is indicated diagrammatically in Fig. 9.

The above-described invention may be made in any suitable material, although sheet metal is generally preferred, as that will best resist the wear and tear and the action of heat which is incident to its use. When a pie is being baked, it is not necessary that all compartments be filled, or if filled it is not necessary that they all be filled with the same kind of pastry, as each compartment is to some extent independent of the other compartments, so that the pastry in one part will not interfere with the pastry in another during the cooking. When the pie is cooked, each piece may be removed without in any way disturbing any other piece and without breaking or cutting the crust.

The division into constituent parts facilitates the removal of the pie and permits the pie to be baked either in one or more separate and distinct plates when only a small pie is desired or the oven is too small to receive the entire and united plate.

Having described certain embodiments of my invention, I wish it to be understood that I do not wish to be restricted thereto, as I regard all structures as equivalents that come within the scope of the following claim.

I claim—

A pie-plate or similar article divided into a plurality of separate and distinct parts, partitions on some of the edges of said parts but not on all of said edges so that when the parts are assembled, an edge with a partition will be adjacent to an edge without a partition.

Signed in the city, county, and State of New York this 29th day of January, 1903.

MILLIE THORNE.

Witnesses:
O. E. EDWARDS, Jr.,
ERNEST J. WEBER.